US012755861B2

(12) United States Patent
Nie et al.

(10) Patent No.: US 12,755,861 B2
(45) Date of Patent: Oct. 6, 2026

(54) METHOD FOR REGULATING THERMAL BOUNDARY CONDUCTANCE BETWEEN METAL AND INSULATOR

(71) Applicant: NANJING UNIVERSITY, Nanjing (CN)

(72) Inventors: Yuefeng Nie, Nanjing (CN); Yipeng Zang, Nanjing (CN); Minghui Lu, Nanjing (CN); Xuejun Yan, Nanjing (CN); Chen Di, Nanjing (CN); Zhiming Geng, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 425 days.

(21) Appl. No.: 18/285,473

(22) PCT Filed: Nov. 1, 2022

(86) PCT No.: PCT/CN2022/128946
§ 371 (c)(1),
(2) Date: Oct. 3, 2023

(87) PCT Pub. No.: WO2023/072299
PCT Pub. Date: May 4, 2023

(65) Prior Publication Data
US 2024/0145114 A1 May 2, 2024

(30) Foreign Application Priority Data
Nov. 1, 2021 (CN) ......................... 202111282552.2

(51) Int. Cl.
*H01B 3/00* (2006.01)
*H01B 1/02* (2006.01)
(Continued)

(52) U.S. Cl.
CPC ............ *H01B 3/004* (2013.01); *H01B 1/023* (2013.01); *H01B 3/10* (2013.01); *H01B 13/0016* (2013.01); *H01B 13/222* (2013.01)

(58) Field of Classification Search
CPC .... H01B 3/004; H01B 1/023; H01B 13/0016; H01B 13/222
(Continued)

(56) References Cited

U.S. PATENT DOCUMENTS

2015/0144588 A1 5/2015 Ihlefeld et al.
2020/0212286 A1* 7/2020 Ishii ...................... C23C 14/088

FOREIGN PATENT DOCUMENTS

CN 108565529 A 9/2018
CN 114005875 A 2/2022
(Continued)

OTHER PUBLICATIONS

International Search Report and Written Opinion for Application No. PCT/CN2022/128946, dated Jan. 5, 2023.

*Primary Examiner* — Phuc T Dang
(74) *Attorney, Agent, or Firm* — MARSHALL, GERSTEIN & BORUN LLP

(57) ABSTRACT

Provided is a method for regulating a thermal boundary conductance between a metal and an insulator, including: arranging a metal on a surface of an insulator, a contact surface between the metal and the insulator being a boundary between the metal and the insulator; and the insulator including a ferroelectric, a piezoelectric, or a pyroelectric; applying an external electric field or stress to the ferroelectric, and adjusting a magnitude of the external electric field or stress, or an included angle between a direction of the external electric field or stress with the boundary to regulate the thermal boundary conductance; or applying a stress to the piezoelectric, and adjusting a magnitude of the stress, or an included angle between a direction of the stress with the
(Continued)

boundary to regulate the thermal boundary conductancer; or adjusting a temperature of the pyroelectric to regulate the thermal boundary conductance.

20 Claims, 3 Drawing Sheets

(51) Int. Cl.

| | |
|---|---|
| ***H01B 3/10*** | (2006.01) |
| ***H01B 13/00*** | (2006.01) |
| ***H01B 13/22*** | (2006.01) |

(58) Field of Classification Search
USPC .......................................................... 438/795
See application file for complete search history.

(56) References Cited

FOREIGN PATENT DOCUMENTS

| | | | | | |
|---|---|---|---|---|---|
| KR | 20190084656 | A | * | 7/2019 | ......... H01B 13/0016 |
| KR | 102054673 | B1 | * | 12/2019 | ............... H01B 1/02 |
| KR | 20200122284 | A | * | 10/2020 | ............... H01B 1/02 |

* cited by examiner

METHOD FOR REGULATING THERMAL BOUNDARY CONDUCTANCE BETWEEN METAL AND INSULATOR

CROSS REFERENCE TO RELATED APPLICATION

The present application is a national stage application of International Patent Application No. PCT/CN2022/128946, filed on Nov. 1, 2022, which claims priority to the Chinese Patent Application No. CN202111282552.2, filed with the China National Intellectual Property Administration (CNIPA) on Nov. 1, 2021, and entitled "METHOD FOR REGULATING THERMAL BOUNDARY CONDUCTANCE BETWEEN METAL AND INSULATOR". The disclosure of the two applications is incorporated herein by reference in its entirety.

TECHNICAL FIELD

The present disclosure belongs to the technical field of material science, and more specifically relates to a method for regulating a thermal boundary conductance between a metal and an insulator.

BACKGROUND

Heat dissipation is one of the main limiting factors that restrict the transistor density and computing power of chips from continuing to rise. The regulation of the thermal conductance of nanostructured materials and the dynamic regulation of the thermal transportation properties of functional materials are key issues in fundamental research and electronic device applications. With the continuous miniaturization of electronic devices, peculiar thermal transportation behaviors may emerge, such as materials exhibiting negligible thermal resistance and the ballistic propagation of phonons. At the nanoscale, the thermal resistance is mainly determined by the scattering of phonons at boundaries. Therefore, the conversion efficiency of thermal energy between carriers at boundaries becomes extremely important. Since electrons and phonons are dominant in the heat conduction in metals and insulators, respectively, heat transfer must occur between the electrons and phonons if heat is to be allowed to pass through the boundary between metals and insulators. This electron (metal)-phonon (insulator) coupling can occur indirectly or directly. In the case of indirect occurrence, the electron-phonon coupling occurs on a metal side, and subsequently, the phonon coupling occurs between the metal and the insulator, as at a junction between two insulators. In the case of direct occurrence, electron-phonon coupling occurs between the free electrons in the metal and the phonons in the insulator. However, the unclear mechanism of interface electron-phonon coupling hinders the regulation of thermal conductance at the interface.

In recent years, the regulation of thermal transportation properties of materials has received extensive attention. At present, a variety of methods for regulating thermal conductance have been formed, including chemical element doping, superlattice construction, crystal structure optimization, domain wall of ferroelectrics, or grain boundary density control. For the regulation of thermal boundary conductance between materials, it has been widely used to improve the thermal boundary conductance between metals and insulators by regulating the thermal transportation of boundaries through chemical bonding modification, by surface roughness engineering, or by inserting a buffer layer.

The boundary between metals and insulators is a common boundary structure in modern electronic devices, and there are a large number of boundaries between metals and insulators in novel electronic devices, such as film nano-capacitors, nano-ferroelectric memories, and ferroelectric tunnel junctions. Therefore, it urgently needs to develop a new strategy for effectively regulating the thermal boundary conductance between metals and insulators. The main carriers for conducting thermal energy between metals are thermalized electrons, and those between insulated ferroelectrics are phonons.

Therefore, it is an important scientific and technical issue to be solved urgently to improve the electron-phonon coupling at the boundary between metals and insulators, thus improving the heat transport efficiency of the boundary. The solution to this issue will lay a solid foundation for the popularization and application of technologies. Currently, it is urgent to design a method that can easily and effectively regulate the thermal boundary conductance between metals and insulators, thereby applying the method in the design and application of power electronic devices.

SUMMARY

1. Problem to be Solved

For the problem of cumbersome processes and low efficiency in regulating the thermal boundary conductance between metals and insulators in the prior art, the present disclosure provides a method for regulating thermal boundary conductance between a metal and an insulator. In the present disclosure, an insulator material with polarization characteristics is selected to be combined with the metal instead of ordinary insulating material, and the polarization direction or the polarization intensity of the polarization material is changed by an external electric field or a stress or other means. In this way, the problem of cumbersome processes and low efficiency in regulating the thermal boundary conductance between metals and insulators in the prior art is effectively solved.

2. Technical Solutions

To solve the above problem, the present disclosure adopts the following technical solutions:

The present disclosure provides a method for regulating a thermal boundary conductance between a metal and an insulator, including:

- arranging the metal on a surface of the insulator, a contact surface between the metal and the insulator being a boundary between the metal and the insulator, and the insulator including one member selected from the group consisting of a ferroelectric, a piezoelectric, and a pyroelectric;
- under the condition that the insulator is the ferroelectric applying an external electric field or a stress to the ferroelectric, and adjusting a magnitude of the external electric field or the stress, or an included angle between a direction of the external electric field or the stress with the boundary between the metal and the insulator to regulate the thermal boundary conductance between the metal and the insulator;
- under the condition that the insulator is the piezoelectric, applying a stress to the piezoelectric, and adjusting a magnitude of the stress, or an included angle between a direction of the stress with the boundary between the metal and the insulator to regulate the thermal boundary conductance between the metal and the insulator; and under the condition that the insulator is the pyroelectric, adjusting a temperature of the pyroelectric to regulate the thermal boundary conductance between the metal and the insulator.

In some embodiments, under the condition that the insulator is the ferroelectric, the direction of the external electric field or the stress is adjusted between a direction parallel to the boundary between the metal and the insulator, and a direction perpendicular to the boundary between the metal and the insulator.

It should be noted that, under the condition that the thermal boundary conductance between the metal and the insulator is regulated by adjusting the magnitude of the stress, it is necessary to satisfy that an included angle between a spontaneous polarization direction of the ferroelectric with the boundary between the metal and the insulator is not zero. Because under the condition that the included angle is zero, only adjusting the magnitude of the stress may cause charges to gather at both ends of the insulator, and the charges cannot be gathered at the boundary. As a result, under the condition that the included angle is not zero, even adjusting the magnitude of the stress alone can adjust a degree of charge accumulation at the boundary, thereby regulating the thermal conductance.

In some embodiments, the ferroelectric includes one or a combination of two or more selected from the group consisting of $PbTiO_3$, $BiFeO_3$, $BaTiO_3$, $LiNbO_3$, $PbZr_xTi_{1-x}O_3$, and $[(PbMg_{0.33}Nb_{0.67}O_3)_{1-x}$: $PbTiO_3)_x]$, x satisfying $x \in (0, 1)$.

In some embodiments, under the condition that the insulator is the ferroelectric, the regulating is conducted by a process including the following steps:

(1) selecting the ferroelectric as the insulator, and plating a metal layer on a surface of the ferroelectric to form a metal/ferroelectric structure;

(2) applying an out-of-plane electric field or an in-plane electric field at a boundary between the metal and the ferroelectric in the metal/ferroelectric structure, such that a polarization direction of the ferroelectric is perpendicular to a direction of the boundary between the metal and the ferroelectric, or parallel to the direction of the boundary between the metal and the ferroelectric; and (3) determining a thermal boundary conductance of the metal/ferroelectric structure by time-domain thermoreflectance (TDTR).

In some embodiments, under the conditions that the insulator is the piezoelectric, the regulating is conducted by a process including the following steps:

preparing a metal/piezoelectric/bonding layer/flexible substrate composite structure, applying a stress to the flexible substrate to drive a deformation of a metal/piezoelectric structure, and adjusting a magnitude of the stress to regulate the thermal boundary conductance between the metal and the insulator.

In some embodiments, the metal/piezoelectric/bonding layer/flexible substrate composite structure is a film structure.

In some embodiments, the metal/piezoelectric/bonding layer/flexible substrate composite structure is prepared by a process including the following steps:

(1) coating a bonding layer onto a surface of a piezoelectric/water-soluble layer/substrate composite film to obtain a bonding layer/piezoelectric/water-soluble layer/substrate composite film, inverting one side of the composite film with the bonding layer on a flexible substrate, and heating and curing to obtain a cured composite film;

(2) dissolving and removing the water-soluble layer in the cured composite film, such that the piezoelectric is separated from the substrate to obtain a piezoelectric/bonding layer/flexible substrate composite film; and (3) plating a metal on a surface of the piezoelectric of the piezoelectric/bonding layer/flexible substrate composite film to obtain the metal/piezoelectric/bonding layer/flexible substrate composite structure.

In some embodiments, the bonding layer is made of a material comprising epoxy resin; the heating and curing is conducted at a temperature of 80° C. to 100° C. for 0.5 h to 1.5 h; the water-soluble layer is made of a material comprising $Sr_3Al_2O_6$; and the removing is conducted by immersing the water-soluble layer in deionized water for 48 h to 72 h.

In some embodiments, the plating of the metal is conducted by vacuum evaporation, magnetron sputtering, or chemical vapor deposition.

In some embodiments, the metal comprises one member selected from the group consisting of Al and Au; and the metal has a thickness of 60 nm to 120 nm.

In some embodiments, the method further includes: arranging an ordinary insulator on another side of the insulator opposite to the metal to obtain a three-layer structure of metal/insulator/ordinary insulator; and according to a type of the insulator in an intermediate layer of the three-layer structure, regulating the thermal boundary conductance between the metal and the insulator by a process corresponding to the type of the insulator for the three-layer structure. In some embodiments, the insulator of the intermediate layer has a thickness of 2 nm to 10 nm.

In the present disclosure, the ordinary insulator refers to an insulator that has no spontaneous polarization and almost no relative movement of internal positive and negative charges under external conditions, and that does not belong to the ferroelectric, piezoelectric, and pyroelectric, and thus possesses no ferroelectricity, piezoelectricity, and pyroelectricity. It should be noted that the above limitation of the ordinary insulator is for the three-layer structure of metal/insulator/ordinary insulator, which is intended to facilitate heat conduction between the ordinary insulator and the metal. However, it does not mean that only the ordinary insulator can be provided on another side of the insulator opposite to the metal, and metals or the insulator mentioned in the present disclosure or other materials can still be provided at this position.

The present disclosure further provides use, in which, a heat transport channel of a boundary may be selectively opened or closed by regulating a polarization direction of a ferroelectric. The use may be applied in a thermal logic device.

3. Beneficial Effects

Compared with the prior art, the present disclosure has the following beneficial effects:

(1) The present disclosure provides a method for regulating a thermal boundary conductance between a metal and an insulator, including: arranging a metal on a surface of an insulator, a contact surface between the metal and the insulator being a boundary between the metal and the insulator, and the insulator including a ferroelectric, a piezoelectric, or a pyroelectric; under the condition that the insulator is the ferroelectric, applying an external electric field or a stress to the ferroelectric, and adjusting a magnitude of the external electric field or the stress, or an included angle between a direction of the external electric field or the stress with the boundary between the metal and the insulator to regulate the thermal boundary conductance between the metal and the insulator; under the condition that the insulator is the piezoelectric, applying a stress to the piezoelectric, and adjusting a magnitude of the stress, or an included angle between a direction of the stress with the boundary between the metal and the insulator to regulate the thermal boundary conductance between the metal and the insulator; and under the condition that the insulator is the pyroelectric, adjusting a temperature of the pyroelectric to regulate the thermal boundary conductance between the metal and the insulator. Through the above method, the ferroelectric has spontaneous polarization, and its polarization strength may be reversed with the direction of the external electric field. Therefore, the original polarization direction or polarization intensity of the ferroelectric may be changed after applying the external electric field. For the metal/ferroelectric structure, when the external electric field is applied such that the polarization direction of the ferroelectric is perpendicular to or tends to be perpendicular to the boundary between the metal and the ferroelectric, the charges in the ferroelectric will accumulate at the boundary. At this time, the existence of the accumulated charges will promote the coupling of metal electrons and insulator phonons at the boundary, thereby improving the thermal boundary conductance. On the contrary, when the external electric field is applied such that the polarization direction of the ferroelectric is parallel or tends to be parallel to the boundary between the metal and the ferroelectric, the charges accumulated at the boundary disappear. As a result, the coupling effect of metal electrons and insulator phonons at the boundary is reduced, and the thermal conductance is reduced. Accordingly, the thermal boundary conductance between the metal and the insulator may be regulated by adjusting the included angle between the direction of the external electric field with the boundary between the metal and the insulator. However, the principles of adjusting the intensity of the external electric field are similar. When the spontaneous polarization direction of the ferroelectric has a certain included angle with the boundary between the metal and the insulator, adjusting the intensity of the electric field or the magnitude of the stress may also adjust the accumulation degree of charge at the boundary, thus regulating the thermal conductance. The deformation of piezoelectric formed under a pressure state makes the internal positive and negative charge centers no longer coincide, thereby changing the accumulation degree of charge at the boundary and then regulating the thermal conductance. Pyroelectric may produce corresponding changes in the intensity of spontaneous polarization under different temperatures, thereby changing the accumulation degree of charge at the boundary and then regulating the thermal conductance. To sum up, in the present disclosure, the principle of regulating the thermal boundary conductance between the ferroelectric, piezoelectric, or pyroelectric and metal is similar, i.e., the thermal boundary conductance between the metal and the insulator may be regulated by regulating the accumulation degree of charge at the boundary between the metal and the insulator through a corresponding adjustment mode. Therefore, the present disclosure improves the traditional complex regulation method and creatively proposes that the thermal boundary conductance between the metal and the insulator may be regulated by adjusting the charge accumulated at the boundary, thereby effectively improving efficiency and convenience level in regulating the thermal boundary conductance between the metal and the insulator, which has important implications for the thermal management of power electronic devices.

(2) In the present disclosure, the method for regulating a thermal boundary conductance between a metal and an insulator is based on the structure of the metal/insulator. The method further includes: arranging an ordinary insulator on another side of the insulator opposite to the metal to obtain a three-layer structure of metal/insulator/ordinary insulator; and according to a type of the insulator in an intermediate layer of the three-layer structure, regulating the thermal boundary conductance between the metal and the insulator by a process corresponding to the type of the insulator for the three-layer structure. In the present disclosure, the thermal boundary conductance between the metal and the insulator is regulated by adjusting the degree of charge accumulation at the boundary between metals and insulators. Therefore, the thermal boundary conductance of the three-layer structure may be further regulated under the action of the insulator in the intermediate layer through this method, thus facilitating the heat conduction between ordinary insulators and metals.

BRIEF DESCRIPTION OF THE DRAWINGS

FIG. 5A to FIG. 5C show X-ray diffraction (XRD) patterns of the BFO film in Example 1 under the uniaxial tensile stress along the direction, wherein FIG. 5A shows the diffraction peak position of a (002) plane change under stress; FIG. 5B shows the diffraction peak position of a (011) plane change under stress; and FIG. 5C shows the diffraction peak position of a (101) plane change under stress.

Figure 1:
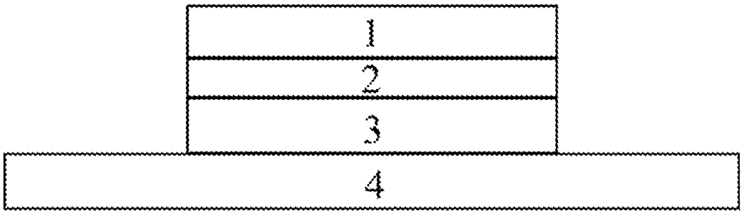
FIG. 1 shows a sample structure diagram of the metal/piezoelectric/bonding layer/flexible substrate composite structure according to an embodiment of the present disclosure.

The reference numerals in the FIGS. 1. Metal; 2. Piezoelectric; 3. Bonding layer; 4. Flexible substrate; 5. Tensile displacement platform; 6. Cantilever; 7. Screw; 8. Flexible substrate; 9. Sample to be tested; 10. Metal; 11. Ferroelectric single crystal whose polarization direction is perpendicular to the upper surface; 12. Metal; and 13. Ferroelectric single crystal whose polarization direction is parallel to the upper surface.

DETAILED DESCRIPTION OF THE EMBODIMENTS

The following detailed description of exemplary examples of the present disclosure refers to drawings. The drawings form a part of the description, in which an exemplary embodiment that the present disclosure can be practiced is shown as an example. Features of the present disclosure are identified by reference numerals. The following more detailed description of the examples of the present disclosure is not intended to limit the claimed scope of the present disclosure, but is merely illustrative and not restrictive of the description of the features and characteristics of the present disclosure. These examples are given to suggest the best mode for carrying out the present disclosure, and are sufficient to enable those skilled in the art to practice the present disclosure. However, it should be understood that various modifications and changes can be made without departing from the scope of the present disclosure as defined in the appended claims. The detailed description and drawings should be considered illustrative only and not restrictive. Any such modifications and variations, if existing, will fall within the scope of the present disclosure as described herein. In addition, the background is intended to illustrate the research and development status and significance of the present technology and is not intended to limit the present disclosure or the application field of the present disclosure.

Unless otherwise defined, all technical and scientific terms used herein have the same meanings as those generally understood by those skilled in the art of the present disclosure. The terms used in the specification of the present disclosure are only intended to describe the specific examples and are not intended to limit the present disclosure.

The present disclosure will be further described below with reference to specific examples.

Example 1

This example provided a method for regulating a thermal boundary conductance between a metal and an insulator, specifically a method for regulating a thermal boundary conductance of a metal aluminum/bismuth ferrite (Al/BFO) sample under a polarization evolution. Since the ferroelectric BFO also had piezoelectricity, it was used as a piezoelectric in this example. A stress was applied to the BFO, and the thermal boundary conductance between the metal and the insulator was regulated by adjusting the magnitude of the stress. The method was performed by the following steps:

(1) Preparation: A $BiFeO_3/Sr_3Al_2O_6/SrTiO_3$ (BFO/SAO/STO) film spin-coated with an epoxy resin (Epoxy) on its surface was inverted on a flexible substrate (PEN), and heated at 100° C. for 1 h to cure the epoxy resin, obtaining a cured sample. The effect of the epoxy resin was to firmly adhere the ferroelectric film to the flexible substrate, which was convenient to achieve the regulation of a polarization direction of the ferroelectric film by mechanically stretching the flexible substrate. Therefore, the ferroelectric film adhered tightly to the flexible substrate after heating and curing. The cured sample was immersed in clean deionized water for 48 h. After the water-soluble layer SAO was completely dissolved, the ferroelectric film BFO was separated from the substrate STO, obtaining a sample with a BFO/Epoxy/PEN structure. A metal Al layer with a thickness of 80 nm was plated on a surface of the BFO by magnetron sputtering, obtaining an Al/BFO/Epoxy/PEN sample shown in FIG. 1, at this time a sample with a metal/piezoelectric/bonding layer/flexible substrate composite structure was constructed.

Figure 2:
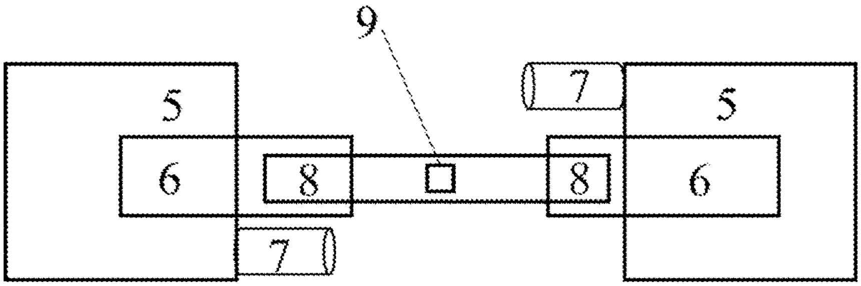
FIG. 2 shows an object picture of the tensile displacement platform according to an embodiment of the present disclosure.

(2) Experiment: A stress was applied to the film sample by rotating a screw to expand a distance of a cantilever. A change in a polarization state of the ferroelectric sample was obtained by an X-ray diffraction (XRD) system and a piezoelectric force microscope (PFM) system. A change in the thermal boundary conductance between Al and BFO under different stresses was measured by a TDTR system. The adjustment was performed by the following steps: as shown in FIG. 2, two ends of the sample were firmly adhered to the cantilever of a displacement platform with glue, and an original distance between the cantilevers was $L_0$. A position of the displacement platform could be adjusted, and the distance between the cantilevers could be expanded through the screw. When an elongation of the distance was $\Delta L$, an elongation rate of a cantilever distance was $\Delta L/L_0$. The elongation rate of the cantilever was defined as a nominal stress applied on the sample, and an actual stress was obtained by a lattice change determined by an XRD instrument.

Figure 4:
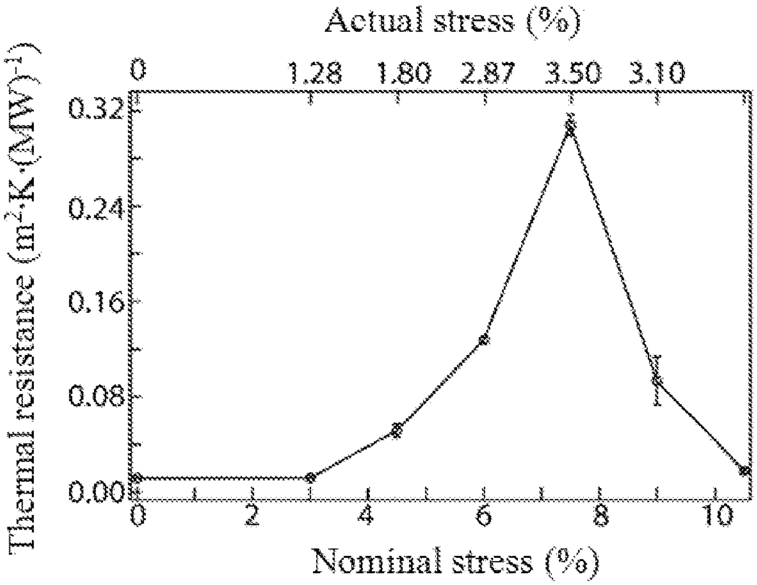
FIG. 4 is a schematic diagram showing the thermal resistance change of the boundary between aluminum and bismuth ferrite (Al/BFO) caused by the polarization reversal of the ferroelectric under the effect of stress regulation in Example 1.
Figure 5A:
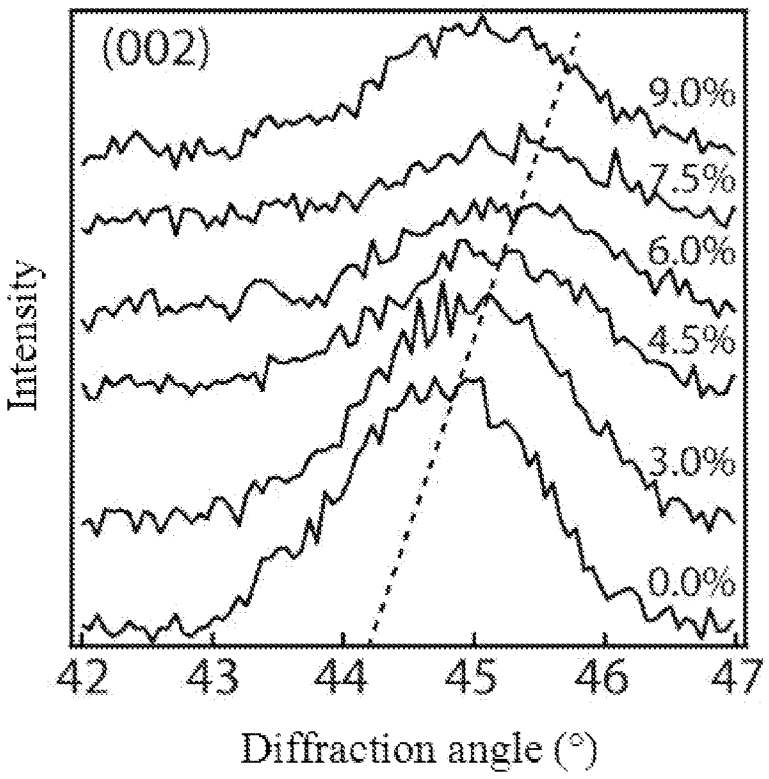
Figure 5B:
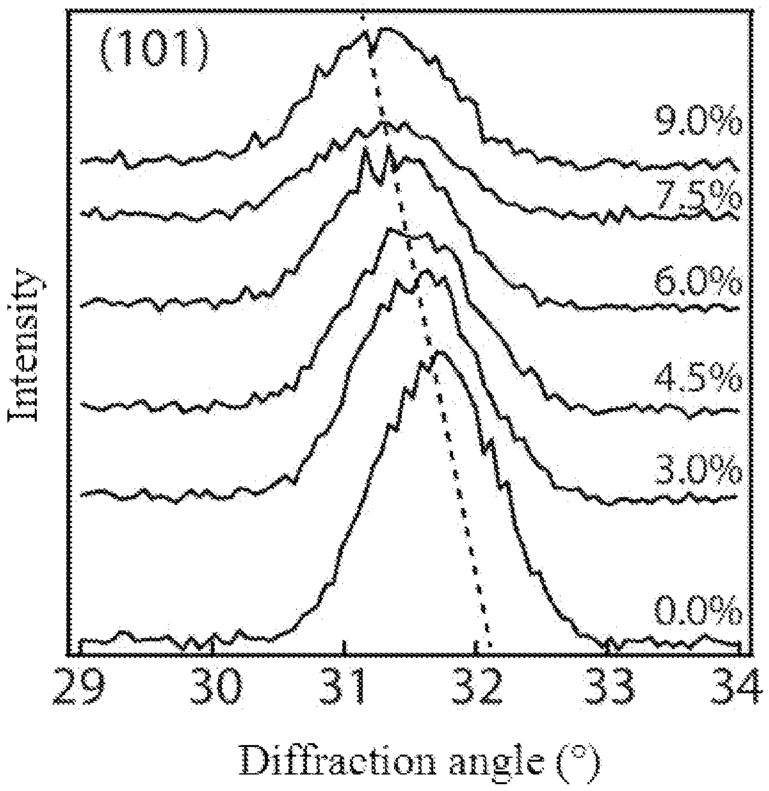
Figure 5C:
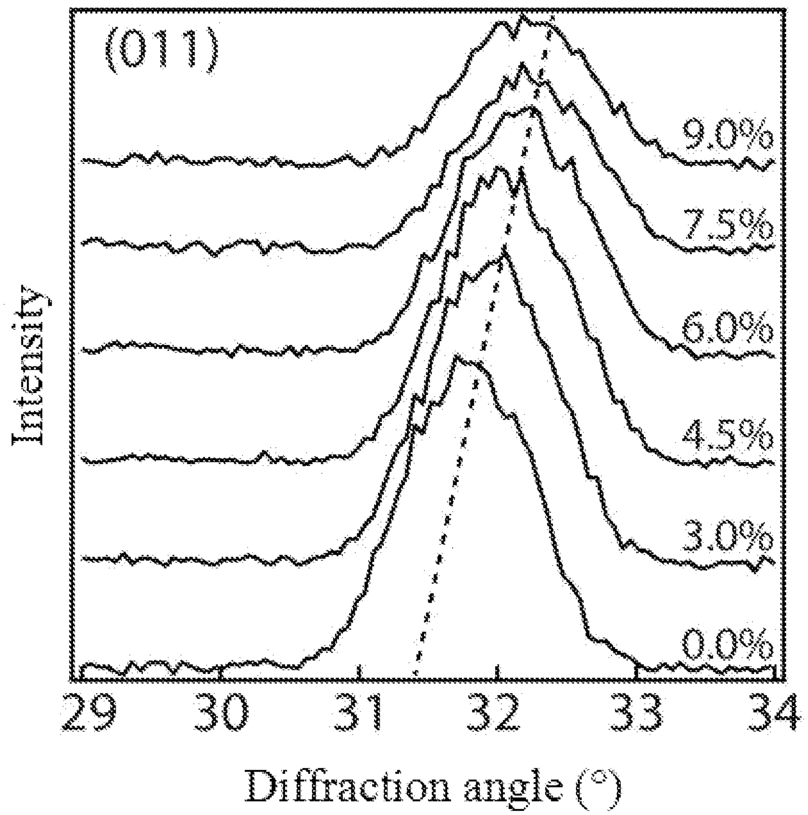
Figure 6:
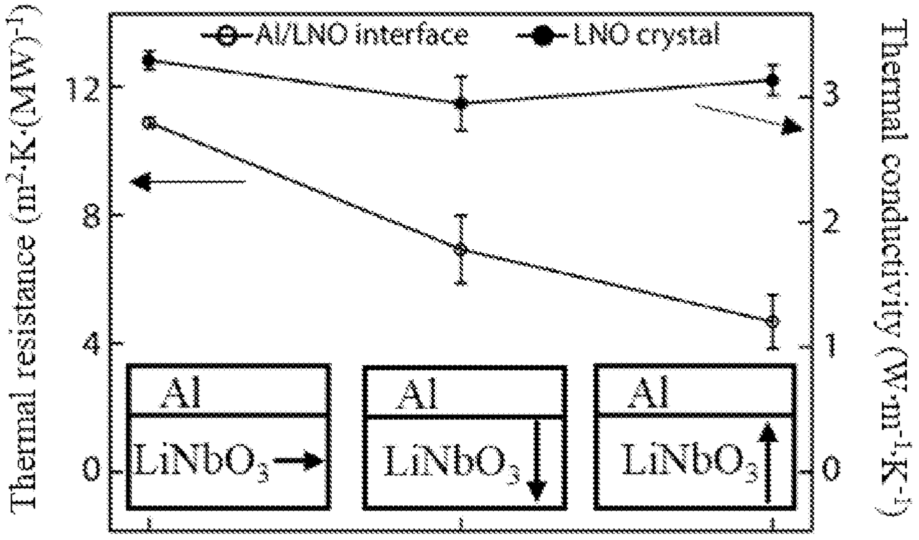
FIG. 6 is a schematic diagram showing the thermal conductance changes at the boundary between Al and $LiNbO_3$ and in the $LiNbO_3$ crystal under different polarization states in Example 2 (where the direction of arrows represents the polarization direction of $LiNbO_3$).

(3) Conclusion and analysis: the data measured by XRD and TDTR were analyzed. The XRD data are shown in FIG. 5. As can be seen, the diffraction peak positions of a (002) plane, a (011) plane, and a (101) plane change under stress. The film produces a maximum tensile stress of 3.5%. Finally, it is concluded that the change of stress causes the polarization direction of the ferroelectric film to change from being perpendicular to the boundary between Al and BFO to being parallel to the boundary between Al and BFO. The polarization deflection leads to a decrease in accumulated charges at the boundary, thereby causing a decrease in the thermal boundary conductance. The detection results of this example are shown in FIG. 4. This is because the initially-applied transverse stress parallel to the boundary could make the polarization direction from being parallel to the direction of the boundary to being perpendicular to the direction of the boundary. The ferroelectric polarization could increase the charge accumulated at the boundary under the action of stress, and the electron-phonon coupling on the boundary between the metal and the piezoelectric may be enhanced, thereby increasing the thermal boundary conductance. When the nominal stress continued to increase, the polarization direction is changed from a direction perpendicular to the boundary to a direction parallel to the boundary. The deflection of ferroelectric polarization under the action of stress could reduce the charges accumulated at the boundary, and the electron-phonon coupling on the boundary metal and the piezoelectric is weakened, thereby reducing the thermal boundary conductance.

Example 2

Figure 3:
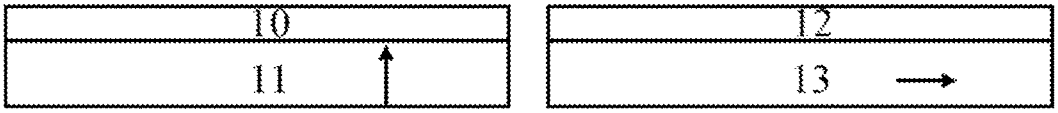
FIG. 3 shows a metal/ferroelectric sample according to an embodiment of the present disclosure (where the polarization direction of the ferroelectric on the left side is perpendicular to the upper surface, and the polarization direction of the ferroelectric on the right side is parallel to the upper surface).

This example provided a method for regulating a thermal boundary conductance between a metal and an insulator, specifically a method for regulating the thermal conductance of a metal aluminum/lithium niobate ($Al/LiNbO_3$) sample under different polarization conditions. The method was performed by the following steps:

(1) Preparation: An Al metal layer with a thickness of about 80 nm was vapor plated on a surface of a $LiNbO_3$ crystal by magnetron sputtering, obtaining a metal/ferroelectric ($Al/LiNbO_3$) structure. A longitudinal electric field was applied such that a polarization direction of the ferroelectric was perpendicular to a boundary between the metal and the ferroelectric, as shown on the left of FIG. 3. In addition, a transverse electric field parallel to the boundary was applied such that the polarization direction was changed from being perpendicular to the boundary to being parallel to the boundary, as shown on the right of FIG. 3. Therefore, a state was obtained, in which two polarization directions were perpendicular to an upper surface direction and parallel to the upper surface direction, respectively.

(2) Experiment: A change of the heat transportation properties of the $Al/LiNbO_3$ sample under different polarization directions was determined by a TDTR system.

(3) Conclusion and analysis: The data from TDTR was analyzed. It is concluded that when the polarization direction is perpendicular to the upper surface, the thermal boundary conductance is greater than that when the polarization direction is parallel to the upper surface. The change of the polarization direction leads to the reduction of the accumulated charges at the boundary, thus causing a decrease in the thermal boundary conductance. This is because when the polarization direction of the ferroelectric material is perpendicular to the boundary between the metal and the ferroelectric, the existence of the accumulated charges on the boundary could promote the coupling of metal electrons and insulator phonons, thus causing an increase in the thermal boundary conductance. When the polarization direction of the ferroelectric material is parallel to the boundary, the accumulated charges on the boundary disappear, such that the electron-phonon coupling is weakened, and the thermal boundary conductance between the metal and the insulator decreases.

Example 3

This example provided a method for regulating a thermal boundary conductance between a metal and an insulator, specifically a method for regulating the heat transportation properties of a metal gold/lithium niobate ($Au/LiNbO_3$) sample under different polarization conditions. In this example, specific operation steps were basically the same as those in Example 2, except that: the metal Al was replaced with Au.

The final data from TDTR was analyzed. It is concluded that the measured changing trend of heat transportation is similar to the changing trend of thermal boundary conductance between Al and $LiNbO_3$ in Example 2. When the polarization direction is perpendicular to the upper surface, the thermal boundary conductance is greater than that when the polarization direction is parallel to the upper surface, and the change of the polarization direction leads to the change of the thermal conductance.

Example 4

This example provided a method for regulating a thermal boundary conductance between a metal and an insulator, specifically a method for regulating the thermal conductance of a metal aluminum/zinc oxide (ZnO) sample under different polarization conditions. In this example, specific operation steps were basically the same as those in Example 2, except that:

the insulator lithium niobate was replaced with zinc oxide; in addition, the polarization intensity of the zinc oxide was regulated by changing the temperature.

The final data from TDTR was analyzed. It is concluded that the changing trend of the measured thermal conductance is similar to that of the boundary between Al and $LiNbO_3$ in Example 2, and the change of the polarization intensity leads to the change of the thermal conductance.

Example 5

This example provided a method for regulating a thermal boundary conductance between a metal and an insulator, specifically a method for regulating the thermal conductance of a metal aluminum/BFO/STO sample under different polarization conditions. In this example, specific operation steps were basically the same as those in Example 1, except that: an ordinary insulator STO was provided on another side of the BFO opposite to the metal aluminum, where the BFO layer has a thickness of 5 nm.

The final data from TDTR was analyzed. It is concluded that the changing trend of the measured thermal boundary conductance between Al and BFO is similar to that in Example 1. The change of stress leads to the change of thermal conductance, and on this basis, there is a similar changing trend of thermal conductance between the metal aluminum and the ordinary insulator STO, resulting in effective heat conduction.

Comparative Example 1

This comparative example provided a method for regulating a thermal boundary conductance between a metal and an insulator, specifically a method for regulating the thermal conductance of a metal aluminum/$SrTiO_3$ sample under different polarization conditions. In this comparative example, specific operation steps were basically the same as those in Example 2, except that: the insulator lithium niobate was replaced with an ordinary insulator $SrTiO_3$.

The final data from TDTR was analyzed. It is concluded that the changing trend of the measured thermal conductivity is similar to that of the $LiNbO_3$ crystal in Example 2, and the thermal boundary conductance could hardly be regulated even by changing the external electric field.

The present disclosure has been described in detail above with reference to specific exemplary examples. However, it should be understood that various modifications and changes can be made without departing from the scope of the present disclosure as defined in the appended claims. The detailed description and drawings should be considered illustrative only and not restrictive. Any such modifications and variations, if existing, will fall within the scope of the present disclosure as described herein. In addition, the background is intended to illustrate the research and development status and significance of the present technology and is not intended to limit the present disclosure or the application field of the present disclosure.

More specifically, although exemplary examples of the present disclosure have been described herein, the present disclosure is not limited to these examples, but includes any and all examples that have been modified and omitted examples that can be recognized by those skilled in the art from the foregoing detailed description, such as combinations, adaptations, and/or replacements among the various examples. The limitations in the claims are to be interpreted broadly according to the language used in the claims and not limited to the examples described in the foregoing detailed description or during the prosecution of this application, and these examples should not be considered exclusive. Any steps recited in any method or process claims may be conducted in any order and are not limited to the order presented in the claims. Accordingly, the scope of the present disclosure should be determined only by the appended claims and their legal equivalents, rather than by the description and examples given above.

All technical and scientific terms used herein have the same meaning as commonly understood by those ordinary skilled in the art to which the present disclosure belongs unless otherwise defined. In case of conflict, the definitions in the specification shall prevail. When a thickness, temperature, time, or other value or parameter is expressed in a range, a preferred range, or a range defined by a series of upper and lower preferred values, it should be understood that all ranges formed by any pair of an upper limit or preferred value of any range with a lower limit or preferred value of any range are specifically disclosed, regardless of whether the ranges are independently disclosed. For example, the range of 1 to 50 should be understood as including any number, combination of numbers, or subrange selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50, as well as all decimal values between the above integers, for example, 1.1, 1.2, 1.3, 1.4, 1.5, 1.6, 1.7, 1.8, and 1.9. With respect to subranges, "nested subranges" that extend from any endpoint within the range are specifically considered. For example, nested subranges of the exemplary range 1 to 50 may include 1 to 10, 1 to 20, 1 to 30, and 1 to 40 in one direction, or 50 to 40, 50 to 30, 50 to 20, and 50 to 10.

What is claimed is:

1. A method for regulating a thermal boundary conductance between a metal and an insulator, comprising:

arranging the metal on a surface of the insulator, a contact surface between the metal and the insulator being a boundary between the metal and the insulator, and the insulator comprising one member selected from the group consisting of a ferroelectric, a piezoelectric, and a pyroelectric;

under the condition that the insulator is the ferroelectric, applying an external electric field to the ferroelectric, and adjusting a magnitude of the external electric field, or an included angle between a direction of the external electric field with the boundary between the metal and the insulator to regulate the thermal boundary conductance between the metal and the insulator;

under the condition that the insulator is the ferroelectric or the piezoelectric, applying a stress to the ferroelectric or the piezoelectric, and adjusting a magnitude of the stress, or an included angle between a direction of the stress with the boundary between the metal and the insulator to regulate the thermal boundary conductance between the metal and the insulator; and under the condition that the insulator is the pyroelectric, adjusting a temperature of the pyroelectric to regulate the thermal boundary conductance between the metal and the insulator.

2. The method of claim 1, wherein the ferroelectric comprises one or a combination of two or more selected from the group consisting of $PbTiO_3$, $BiFeO_3$, $BaTiO_3$, $LiNbO_3$, $PbZr_xTi_{1-x}O_3$, and $[(PbMg_{0.33}Nb_{0.67}O_3)_{1-x}:PbTiO_3)_x]$, x satisfying $x \in (\mathbf{0}, \mathbf{1})$.

3. The method of claim 1, wherein under the condition that the insulator is the ferroelectric, the direction of the external electric field or the stress is adjusted between a direction parallel to the boundary between the metal and the insulator, and a direction perpendicular to the boundary between the metal and the insulator.

4. The method of claim 1, wherein under the condition that the insulator is the ferroelectric and the thermal boundary conductance between the metal and the insulator is regulated by adjusting the magnitude of the stress, an included angle between a spontaneous polarization direction of the ferroelectric with the boundary between the metal and the insulator is not zero.

5. The method of claim 1, wherein under the condition that the insulator is the ferroelectric, the regulating is conducted by a process comprising the following steps:

(1) selecting the ferroelectric as the insulator, and plating a metal layer on a surface of the ferroelectric to form a metal/ferroelectric structure;

(2) applying an out-of-plane electric field or an in-plane electric field at a boundary between the metal and the ferroelectric in the metal/ferroelectric structure, such that a polarization direction of the ferroelectric is perpendicular to a direction of the boundary between the metal and the ferroelectric, or parallel to the direction of the boundary between the metal and the ferroelectric; and (3) determining a thermal boundary conductance of the metal/ferroelectric structure by time-domain thermoreflectance (TDTR).

6. The method of claim 1, wherein under the condition that the insulator is the piezoelectric, the regulating is conducted by a process comprising the following steps:

preparing a metal/piezoelectric/bonding layer/flexible substrate composite structure, applying a stress to the flexible substrate to drive a deformation of a metal/piezoelectric structure, and adjusting a magnitude of the stress to regulate the thermal boundary conductance between the metal and the insulator.

7. The method of claim 6, wherein the metal/piezoelectric/bonding layer/flexible substrate composite structure is a film structure.

8. The method of claim 7, wherein the metal/piezoelectric/bonding layer/flexible substrate composite structure is prepared by a process comprising the following steps:

(1) coating a bonding layer onto a surface of a piezoelectric solid/water-soluble layer/substrate composite film to obtain a bonding layer/piezoelectric/water-soluble layer/substrate composite film, inverting one side of the composite film with the bonding layer on a flexible substrate, and heating and curing to obtain a cured composite film;

(2) dissolving and removing the water-soluble layer in the cured composite film, such that the piezoelectric is separated from the substrate to obtain a piezoelectric/bonding layer/flexible substrate composite film; and (3) plating a metal on a surface of the piezoelectric of the piezoelectric/bonding layer/flexible substrate composite film to obtain the metal/piezoelectric/bonding layer/flexible substrate composite structure.

9. The method of claim 8, wherein the bonding layer is made of a material comprising epoxy resin; and the heating and curing is conducted at a temperature of 80° C. to 100° C. for 0.5 h to 1.5 h.

10. The method of claim 8, wherein the water-soluble layer is made of a material comprising $Sr_3Al_2O_6$; and the dissolving and removing is conducted by immersing the water-soluble layer in deionized water for 48 h to 72 h.

11. The method of claim 5, wherein plating the metal is conducted by vacuum evaporation, magnetron sputtering, or chemical vapor deposition.

12. The method of claim 1, wherein the metal comprises one member selected from the group consisting of Al and Au; and the metal has a thickness of 60 nm to 120 nm.

13. The method of claim 1, further comprising:

arranging an ordinary insulator on another side of the insulator opposite to the metal to obtain a three-layer structure of metal/insulator/ordinary insulator; and according to a type of the insulator in an intermediate layer of the three-layer structure, regulating the thermal boundary conductance between the metal and the insulator by a process corresponding to the type of the insulator for the three-layer structure.

14. The method of claim 13, wherein the ordinary insulator comprises $SrTiO_3$.

15. The method of claim 13, wherein the insulator of the intermediate layer has a thickness of 2 nm to 10 nm.

16. A method for thermal management of a power electronic device, comprising using the method of claim 1.

17. The method of claim 16, wherein under the condition that the insulator is the ferroelectric, the power electronic device comprises a thermal logic device.

18. The method of claim 17, wherein under the condition that the power electronic device is the thermal logic device, the thermal management is conducted by selectively opening or closing a heat transport channel of a boundary between the metal and the ferroelectric by regulating a polarization direction of the ferroelectric.

19. The method of claim 8, wherein plating the metal is conducted by vacuum evaporation, magnetron sputtering, or chemical vapor deposition.

20. The method of claim 2, wherein the metal comprises one member selected from the group consisting of Al and Au; and the metal has a thickness of 60 nm to 120 nm.

* * * * *